United States Patent [19]
Maloney

[11] Patent Number: 5,542,653
[45] Date of Patent: Aug. 6, 1996

[54] PORTABLE MODULAR FRAMING TABLE APPARATUS

[76] Inventor: Maurice E. Maloney, P.O. Box 389, Saco, Me. 04072

[21] Appl. No.: 192,112

[22] Filed: Feb. 4, 1993

[51] Int. Cl.⁶ .................................................. B30B 3/02
[52] U.S. Cl. ........................... 269/37; 269/303; 269/901; 269/910; 24/283.5
[58] Field of Search .................................. 269/37, 41, 43, 269/303, 315, 901, 910; 29/283.5, 897.31; 100/913, 295, 100

[56] References Cited

U.S. PATENT DOCUMENTS

| | | | |
|---|---|---|---|
| 3,693,542 | 9/1972 | Moehlenpah | 269/910 |
| 4,629,171 | 12/1986 | Judy et al. | 269/910 |
| 5,342,030 | 8/1994 | Taylor | 269/910 |

*Primary Examiner*—Robert C. Watson
*Attorney, Agent, or Firm*—Devine, Millimet & Branch, P.A.

[57] ABSTRACT

A modular, portable framing table apparatus for facilitating the construction of wood framed structures is disclosed herein. The apparatus comprises at least one subassembly. Each subassembly comprises a pair of parallel, longitudinally extending, and transversely, adjustably separated, rectangular shaped bench modules having a plurality of wood framing member location and retention means positioned in defined relationships with each other. Each subassembly also comprises at least two leg modules to support the bench modules when the apparatus is assembled, and at least two divider modules. The divider modules further comprise attachment/alignment means for precisely joining the divider modules to the leg modules into an assembled apparatus in such a fashion that the assembled apparatus is both rigid and square. Furthermore, the disclosed apparatus is capable of rapid assembly and disassembly and, when disassembled, all of the modules are of a size and shape so that they will all fit in the bed of a standard pickup truck or like vehicle to facilitate their transportation to a remote job-site.

11 Claims, 3 Drawing Sheets

PORTABLE MODULAR FRAMING TABLE APPARATUS

BACKGROUND OF THE INVENTION

This invention relates to the construction of wood frame wall panels. The invention disclosed herein describes a modular, portable framing table apparatus that can be readily adjusted to create wall frames of various heights and lengths. The modular nature of this framing table allows it to be easily and rapidly disassembled, placed in the rear of a standard pick-up truck, and transported from construction site to construction site. In addition, the invention disclosed uses a plastic veneer material on each horizontal surface that communicates with wood frame members to allow a completed wall panel to be removed easily without use of complicated roller mechanisms or the like.

SETTING OF THE INVENTION

In the building industry, prefabrication of wall panels has become more popular in view of increased labor costs. Many of these prefabricated panels are constructed in factories according to specifications and transported to a building site for installation. Framing tables are used to construct these prefabricated panels efficiently. Framing tables allow for the placement of wood framing members in precise locations quickly, to facilitate rapid formation of wall panels.

Typically, framing tables are used in factory environments where they are fixably located upon factory floors. While certain prior art tables are capable of being adjusted to accomodate the construction of wall panels of varying heights, they are incapable of being disassembled, transported to job sites, reassembled, and used on-site. In view of transportation costs and the ability to utilize a framing table apparatus on a job-site, and thus save considerable labor costs, the modular, portable framing table apparatus disclosed herein is very desirable. Until now, framing tables that do possess the portability feature are too cumbersome to be transported in the rear bed of a standard utility vehicle and are too costly to make them economical for use by smaller construction contractors, who often build singular structures at a given site.

In both factory and job-site situations, completed panels are cumbersome in both size and weight. These factors present difficulties in removing completed panels off a framing table apparatus.

Attention is directed to U.S. Pat. No. 4,801,130. This reference uses movable rollers to expedite removal of completed wall panels. However, sophisticated roller mechanisms can be costly and add to the weight of a table, thus impeding portability. Furthermore, this reference does not disclose a framing table that can be easily assembled, disassembled and transported.

The present invention overcomes the problems of the previous practice by creating a modular framing table apparatus that can be disassembled and transported in the rear of a standard utility vehicle, such as a pick-up truck, or the like. The framing table apparatus consists of a number of modular components, all of which are substantially rectangular in shape and none of which are greater in size then the bed of a standard size pick-up truck, or like vehicle. In addition, sophisticated machinery is not required to assemble the framing table apparatus. This allows contractors to avoid using prefabricated panels produced at a factory. In addition, it decreases the costs associated with both transporting the framing table itself and costs of transporting completed panels from a factory to the construction site.

The present invention further overcomes the problems of the previous practice by avoiding the use of costly roller mechanisms to remove completed panels from the framing table apparatus. The disclosed invention uses a slippery plastic veneer material on each horizontal surface that communicates with wood frame members to allow a completed wall panel to be removed easily from the table.

OBJECTIVES OF THE INVENTION

Accordingly, it is an objective of the present invention to provide a modular framing table apparatus to facilitate the construction of wood frame wall panels that is portable in nature.

Another objective of the disclosed invention is to provide a portable framing table apparatus that can be disassembled and transported to a construction site in the bed of a standard size pick-up truck.

A further objective of the disclosed invention is to provide a modular, portable framing table that utilizes plastic veneers on each horizontal surface that communicates with wood frame members to allow a completed wall panel to be removed easily from the framing table without the aid of roller mechanisms or other complicated systems.

A still further objective of the disclosed invention is to provide a framing table that is adjustable to produce wall frames of various desired heights and lengths.

Another objective of the disclosed invention is to provide a modular framing table apparatus at a low cost so that they can be used economically by small to medium sized construction contracting companies.

These and further objectives will become apparent from the following description.

SUMMARY OF THE INVENTION

The foregoing objectives are achieved in a portable framing table apparatus comprised of at least one subassembly; said subassembly comprising two legs, a pair of longitudinally extending and transversely separated benches, and 2 dividers. Each leg has a cantilever shape and a channel centered on the top portion of each leg that runs along the axis of each leg in a direction perpendicular to the longitudinally extending and transversely separated benches. Each of the benches is substantially rectangular and comprises a plate member locator, header member, and a plurality of stud locators, all of which are positioned in measured increments with respect to each other to facilitate the placement of wood framing members. Guide flippers are attached in an off-centered fashion to each stud locator to align a stud member during frame construction.

Swing plates are attached in an off-centered fashion to the first bench of each subassembly to allow for easy removal of a completed frame panel. An angled means is attached to the second bench of each subassembly to allow for the precise squaring of the wall frame panel. In addition, each bench has a number of runners attached to the bottom surface of each bench, each of said runners communicating with the channel in each leg. Moreover, each divider has an angled attachment/alignment means connected at each end. These divider attachment/alignment means communicate with the legs of each subassembly in order to form a precise right angle joint.

DETAILED DESCRIPTION OF THE DRAWINGS

Figure 1:
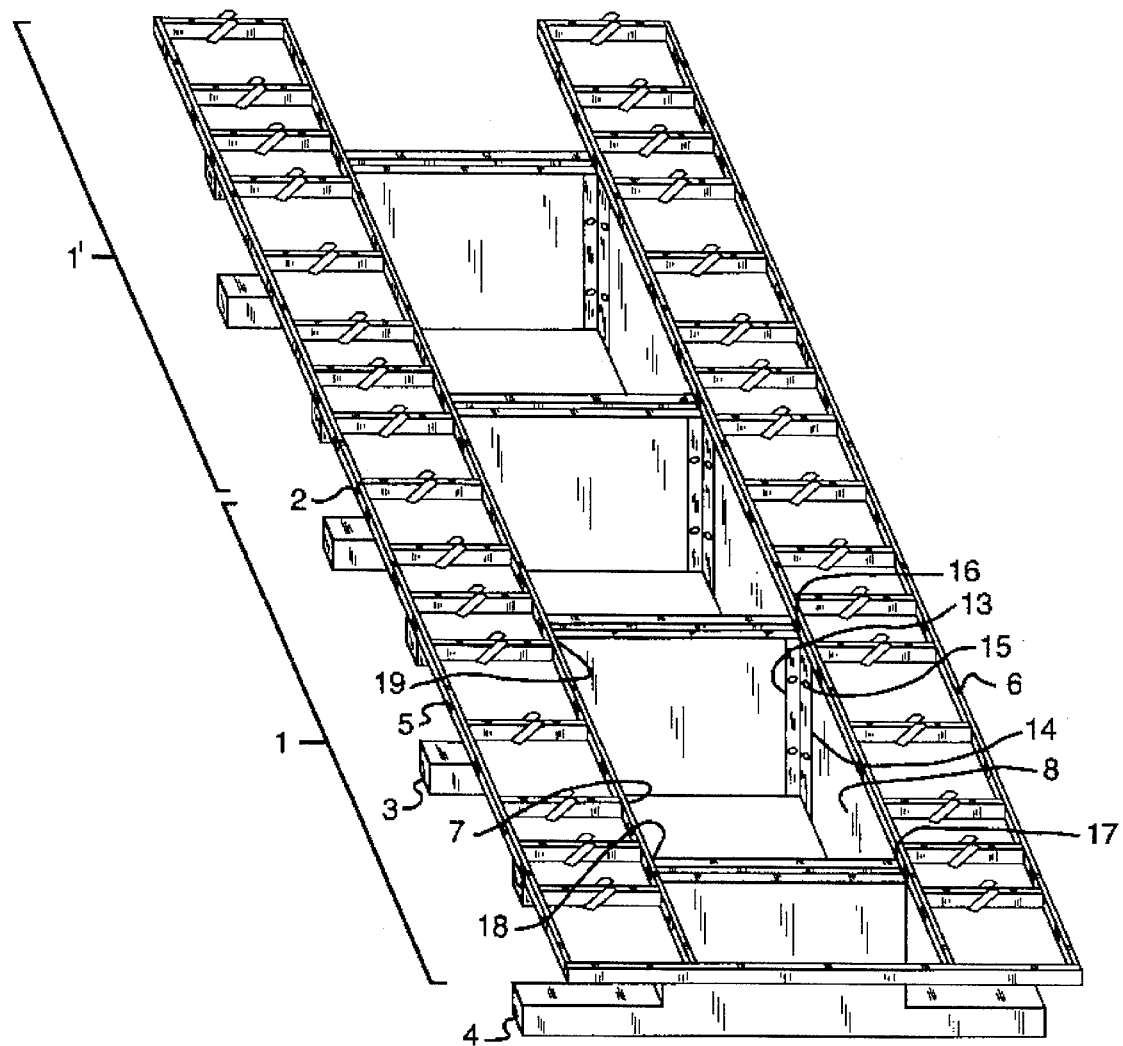
FIG. 1 is a perspective view of the modular, portable framing table apparatus in its assembled state.

Referring now to the drawings, the disclosed modular, portable framing table apparatus incorporates two subassemblies 1 and 1' joined by a fastening means at joint 2. As the two subassemblies are almost identical, construction of subassembly 1 will be explained in further detail herein.

Each subassembly includes at least two leg modules 3 and 4, a first and second longitudinally extending, horizotal and transversely separated bench modules 5 and 6, and two divider modules 7 and 8. The subassemblies are joined by a standard connecting means (not shown) at joint 2. In the preferred embodiment the connecting means incorporates a nut, bolt and washer combination. Each subassembly measures substantially eight feet in its longitudinal dimension and may produce a wall panel up to ten feet high by adjusting each horizontal bench module with respect to the other bench module in a transverse direction along the legs, as will become more fully apparent herein.

When the two subassemblies are joined, as shown in FIG. 1, a wall frame panel may be produced that measures up to substantially sixteen feet long and up to substantially ten feet in height. Smaller wall frames may be produced by utilizing only a portion of the framing table apparatus and by varying the transverse separation distance between the two horizontal benches.

Figure 2:
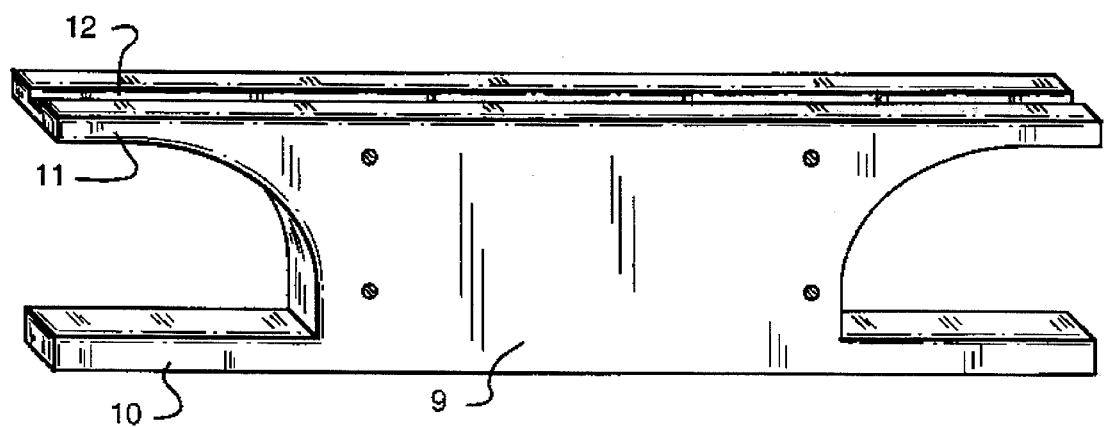
FIG. 2 is a perspective view of one leg of the modular, portable framing table apparatus.

Each leg module has a cantilever shape as can be seen by the illustration of leg module 9 in FIG. 2., thereby allowing storage of framing members directly underneath each horizontal bench thus eliminating the need, for persons involved in the use of the disclosed apparatus, to move about the general work area in order to obtain the framing members required for each wall panel section. Each leg module measures substanially eight feet in length and two feet in height such that they too will fit in the bed of a standard size pick-up truck for ease of transportation to a job-site.

In the preferred embodiment, leg module 9 comprises a base section 10 that is wide enough to ensure stability. The top portion 11 comprises a channel 12 formed in the top portion which runs along the length of leg module 9. When a horizontal bench module is rested upon the leg in its assembled position, runners on the lower planar surface of the bench module communicate with each leg channel. Thus, this channel and runner combination allows for the adjustment of the transverse separation distance between the bench modules, thus allowing for walls of various heights to be constructed using a single framing table apparatus. For example, if a seven foot high wall section is to be built, the framing table operator would simply push or pull each horizontal bench module 5 and 6 of FIG. 1 in a transverse direction to create the desired transverse separation distance between said bench modules. Each leg may also be hollow to facilitate placement of a pneumatic air hose having outlets, on each end of each leg.

Referring now to FIG. 1, the two legs 3 and 4 of subassembly 1 are attached to two dividers 7 and 8 by way of a connecting/squaring means 13. In the preferred embodiment the connecting/squaring means comprises a substantially ninety degree angle means 14. Each angle means is fastened at a first angle face to first and second ends of each divider and at its second face to a leg by fastening means 15. Said fastening means is also a nut, bolt, and washer combination. Thus, when the framing table apparatus is assembled, each divider not only ensures proper separation of the legs to facilitate alignment of the runner and channel cooperation between the horizontal benches and the legs, but also ensures that the table is precisely square thereby resulting in a square wall frame. In addition, supplemental squaring means (not shown) may be attached to the assembled apparatus between corners 17 and 19 as well as between corners 16 and 18.

Figure 3:
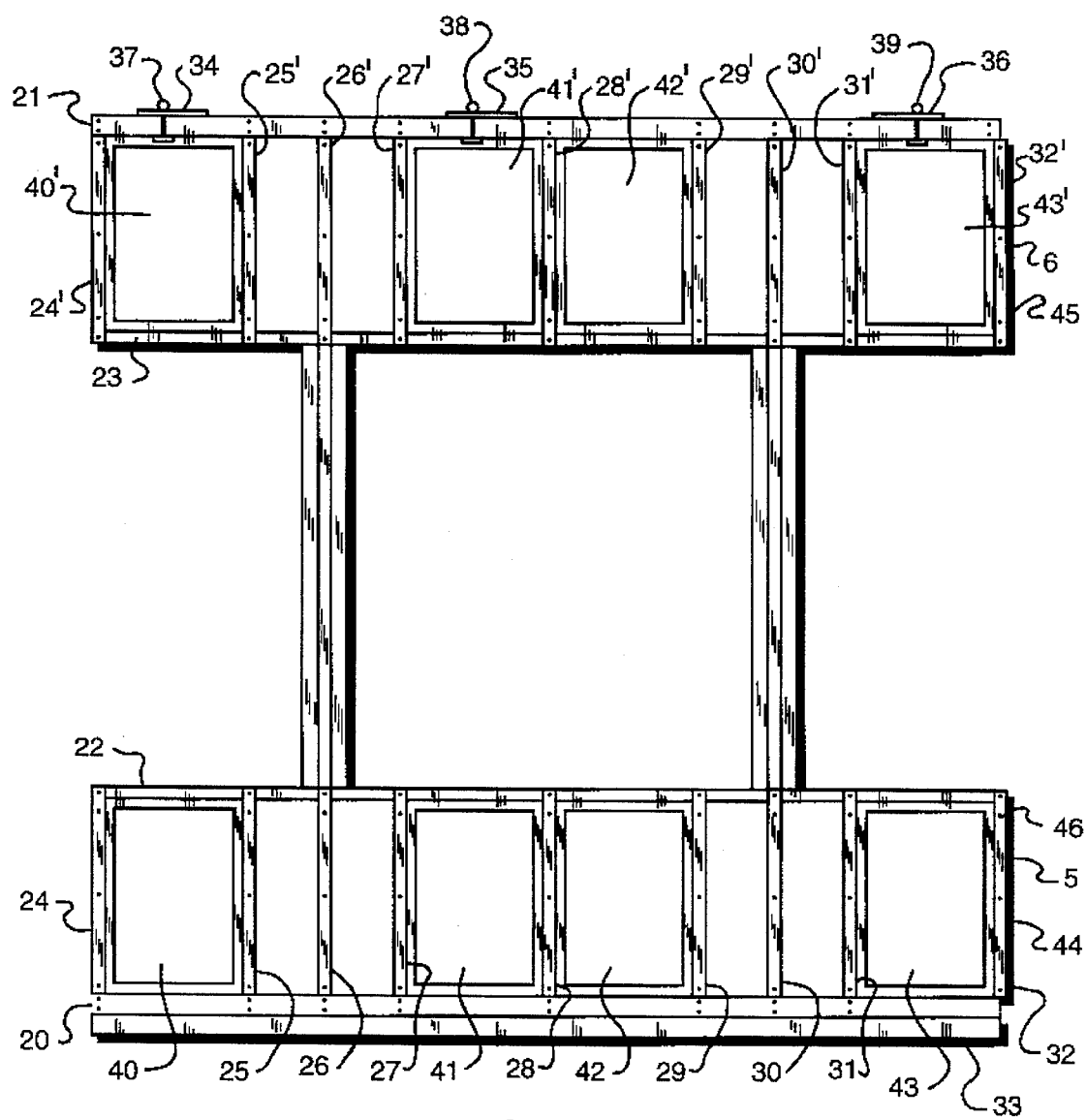
FIG. 3 is a top view of one subassembly of the modular, portable framing table apparatus.

Turning now to FIG. 3, a pair of parallel, longitudinally extending and transversely separated benches are used to form the horizontal planar surface of the assembled, modular framing table. First bench 5 and second bench 6 are substantially rectangular in shape and are formed by a plurality of framing member locators, including plate member locator 20, header member locator 21, a plurality of stud locators 24–32 and 24'–32', and rail members 22 and 23. The stud locators are arranged perpendicular to plate member locator 21 and rail member 23, as well as header member locator 22 and rail member 24. In the preferred embodiment, the plate and header member locators, and the rail members are substantially eight feet long. Each stud locator is substantially 2 feet in length. Thus, each bench measures substantially eight feet long by two feet high to allow it to fit in the bed of a standard size pick-up truck when the modular framing table is in its dissassembled form.

The positioning of the stud locators corresponds to the distance that the wall studs will be located in the completed wall panel. In the preferred embodiment, the distance between stud locators 24 and 25, 27 and 28, 28 and 29, and 31 and 32 is sixteen inches respectively. The distance between stud locators 25 and 26, 26 and 27, 29 and 30, and 30 and 31 is eight inches respectively. Thus, by placing wall studs upon selected stud locators, the framing table operator can produce wall panels with wall studs located on either 16 inch or 24 inch centers.

By way of illustration, if 16 inch centers are desired, wall studs would be placed on stud locators 24, 25, 27, 28, 29, 31 and 32 on horizontal bench 5, which would correspond with stud locators 24', 25', 27', 28', 29', 31' and 32' on horizontal bench 6. Alternatively, if 24 inch centers are desired, wall studs would be placed on stud locators 24, 26, 28, 30 and 32 on horizontal bench 5 (corresponding to locators 24', 26', 28', 30' and 32' on horizontal bench 6).

In addition, the placement of window and door units in a wail frame would necessitate selective installation of studs to coincide with the size of the unit. Moreover, the framing table described herein may be used with other systems that facilitate efficient utilization of space, materials, and labor. More specifically, window and door framing units may be located proximate to the framing table apparatus to reduce labor and transportation time.

Each basic horizontal bench unit is manufactured identically to allow for the mass production of said benches efficiently and inexpensively. However, depending on the accessories affixed to each bench, they become either a top bench unit or a bottom bench unit.

In the subassembly shown in FIG. 3, horizontal bench unit 5 further comprises an angled plate locator means 33 affixed to plate member 20. The angled plate locator means is used to flank a plate member precisely in a perpedicular orientation to the stud members, said plate locator affixed longitudinally on member 20 and extending above the horizontal plane of bench 5. The plate member represents the "bottom" of a completed wall panel, thus a horizontal bench with a plated locator affixed thereto is classified as a bottom bench.

Conversely, horizontal bench 6 contains a header member locator 21. Since a header represents the "top" of a completed wall panel, a horizontal bench comprising a header member locator is a top bench. Instead of an angled plate member locator, a top bench comprises a plurality of swing plates 34–36. Each swing plate is adjustably affixed to said header member locator in an off-centered fashion to header member locator 21 using an adjustable attachment means 37, which secure the swing plates to header member locator 21. Thus, during the construction of a wall panel, the swing plates are manipulated into an active station where they too extend above the horizontal plane of the top bench such that when a plate member, header member and stud members are placed in position upon the framing table apparatus, the adjustable attachment means 37–39 are tightened so as to exert a compressive force upon said header member in a transverse direction along the axis of the stud members to hold all framing members in their respective positions until the wall panel is completed. When a wall panel is completed, loosening of the attachment means 37–39 allows the swing plates to oscillate away from the finished frame to a position at or below the horizontal plane of the table. This facilitates easy removal of a completed wall panel in a transverse direction off of the framing table in a direction towards the header member locator. Each bench may also have sheathing on its underside to more securely hold the bench structure. In the event this sheathing is used, apertures 40, 41, 42 and 43, and 40',41', 42', and 43' are removed from the sheathing to enable an operator to view available supplies stored underneath each bench.

Each of the subassemblies may be joined to create a flaming table that facilitates the construction of a sixteen foot long wall panel. Bench sides 44 and 45, of benches 5 and 6 respectively, are one half the width of the stud locators used to construct the benches. These sides are joined by a connecting means to corresponding sides of two the two horizontal benches of a second framing table subassembly. A slippery plastic veneer material 46 is affixed to the each horizontal surface that communicates with wood frame members to allow a completed wall panel to be removed easily from the table.

The plate member 20, header member 21 and each stud locator 24–32, (and 24'–32') all have a veneer material 46 on their exposed horizontal surfaces that communicate with the wood frame members of the wall panel that is being constructed. This veneer is a slippery plastic material that replaces the use of rollers thereby allowing a completed wall frame to be removed from the table easily. The material is resilient enough not to decay after numerous uses. In the preferred embodiment, GARDUR, an industrial plastic material distributed by the Garland Manufacturing Company of Saco, Me., is used as the veneer material, however, a similar plastic or TEFLON material may be used as well.

Figure 4:
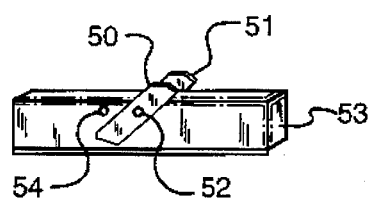
FIG. 4 is a close-up perspective view of a portion of one stud locator and its associated guide flippers.

Turning now to FIG. 4, a pair of guide flippers 50 and 51 are shown attached in an off-centered fashion by a connecting means 52 at approximately the middle of stud locator 53. This off-centered connection together with a bumper means 54, ensures that each guide flipper can rotate in a single direction only. This design is necessary to facilitate rotation of the guide flippers in a rotational direction toward the header member when removing a completed wall panel from the table. These guide flippers may be made of plastic, aluminum, or any number of materials. In the preferred embodiment, GARDUR is used.

What is claimed is:

1. A modular, portable framing table apparatus for facilitating the construction of wood framed structures, said apparatus comprising at least one subassembly, said subassembly comprising;

a pair of parallel, longitudinally extending, and transversely, adjustably separated, rectangular shaped bench modules having upper and lower planar surfaces, a plurality of wood framing member location and retention means positioned in defined relationships with respect to each other, at least two leg modules to support said bench modules when said apparatus is assembled, and at least two divider modules comprising attachment/alignment means for precisely joining said divider modules to said leg modules in such a fashion that the assembled apparatus is both rigid and square, said apparatus being further capable of rapid assembly and disassembly and all of said modules being of a size and shape so as to facilitate their transportation to a remote job-site in the bed of a standard pickup track or like vehicle.

2. The apparatus of claim 1 wherein said wood framing member location and retention means comprise a plate member locator, a header member locator, and a plurality of stud locators:

each of said stud locators comprising at least one pair of guide flippers to hold a stud member in a proper location and orientation during the construction of a wall panel, said guide flippers being rotationally, moveably attached to said stud locators to allow for free rotation of said guide flippers in a singlular direction towards said header member locator to facilitate the removal of a completed wall panel in a transverse direction off of the framing table apparatus;

said plate member locator further comprising an angled plate retention means, said retention means extending above the bench module upper planar surface to facilitate the placement and retention of a plate member in a defined relationship with said stud members during the construction of a wall panel;

said header member locator further comprises a plurality of swing plate header retention means, each of said swing plates having a tightening means to retain said swing plate in active and inactive stations wherein, in said active station, said swing plate extends above the bench module upper planar surface and said tightening means is tightened to exert a compressive force upon a header member in a transverse direction along the axis of said stud members when said header member is positioned upon said bench module in a defined relationship with said plate and stud members, and wherein, in said inactive station, said swing plate is at or below the horizontal plane defined by the bench module upper planar surface to allow a completed wall panel to be readily removed from said framing table apparatus transversely across said bench modules in the direction of the header member locator.

3. The apparatus of claim 2 wherein said framing member locators further comprise a veneer means affixed to each of said bench module upper planar surfaces that communicate with wood framing members so as to facilitate the removal of completed wall panels.

4. The apparatus of claim 3 wherein said veneer means is aluminum.

5. The apparatus of claim 3 wherein said veneer means is a plastic material.

6. The apparatus of claim 5 wherein said plastic material is GARDUR.

7. A modular, portable framing table apparatus for facilitating the construction of wood framed structures, said apparatus comprising at least one subassembly, said subassembly comprising a pair of parallel, longitudinally extending, and transversely separated bench modules, each of said bench modules having horizontal upper and lower planar surfaces and four sides defining a substantially rectangular shape with its longitudinal dimension being longer than its transverse dimension, at least two leg modules to support said bench modules when said apparatus is assembled, and at least two divider modules, said apparatus being capable of rapid assembly and disassembly and all of said modules being of a size and shape so as to facilitate their transportation to a remote job-site in the bed of a standard pickup truck or like vehicle;

each of said bench modules further comprising framing member locators, including header member, plate member, and stud member locators, said locators precisely positioned in measured increments to facilitate the placement of wood framing members that are horizontally supported by said bench modules at desired locations relative to each other during the construction of a wall panel, each of said stud locators having at least one pair of guide flippers to hold a stud member in its proper location and orientation during the construction of said wall panel, said guide flippers being rotationally, moveably attached to said stud locator to allow for free rotation of said guide flippers in a singular direction towards said header member locator to facilitate the removal of a completed wall panel transversely along said bench modules in the direction of the header member locator, said plate member locator having an angled plate retention means that extends above the horizontal plane defined by the bench module upper planar surface to facilitate the placement and retention of a plate member in a defined relationship with said stud members during the construction of a wall panel, said header member locator further comprises a plurality of swing plate header retention means, each of said swing plates having a tightening means to retain said swing plate in active and inactive stations wherein, in said active station, said swing plate extends above the bench module upper planar surface and said tightening means is tightened to exert a compressive force upon a header member in a transverse direction along the axis of said stud members when said header member is positioned upon said bench module in a defined relationship with said plate and stud members, and wherein, in said inactive station, said swing plate is at or below the horizontal plane defined by the bench module upper planar surface to allow a completed wall panel to be readily removed from said framing table apparatus transversely across said bench modules in the direction of the header member locator, each portion of said upper planar surface that communicates with framing members further comprises a plastic veneer material affixed thereto to allow for ease of removal of completed wall panels, said lower planar surface further comprises at least two runners affixed thereto in a transverse direction, said runners allowing said benches to be adjustably, transversely positioned with respect to each other;

each of said leg modules having a cantilever shape to allow for storage of framing members in a horizontal fashion beneath the horizontal planar surface of said bench modules when the framing table apparatus is assembled, and base and top portions, said top portion comprising a channel that runs along the length of said leg and cooperates with said runners of the lower planar surfaces of said bench modules that rest upon said leg module when said apparatus is assembled, thus allowing for adjustment of the transverse separation distance between the two bench modules of each subassembly;

each of said divider modules comprising first and second ends, each of said ends having angled attachment means connected thereto, said attachment means for joining said ends of said dividers to said leg modules in such a fashion that the assembled apparatus is both rigid and square.

8. A modular, portable framing table apparatus for facilitating the construction of wood framed structures, said apparatus comprising at least two subassemblies, each of said subassemblies comprising a pair of parallel, longitudinally extending, and transversely separated bench modules, each of said bench modules having horizontal upper and lower planar surfaces and four sides defining a substantially rectangular shape with its longitudinal dimension being longer than its transverse dimension, at least two leg modules to support said bench modules when said apparatus is assembled, and at least two divider modules, said apparatus being capable of rapid assembly and disassembly and all of said modules being of a size and shape so as to facilitate their transportation to a remote job-site in the bed of a standard pickup truck or like vehicle;

each of said bench modules further comprising framing member locators, including header member, plate member, and stud member locators, said locators precisely positioned in measured increments to facilitate the placement of wood framing members that are horizontally supported by said bench modules at desired locations relative to each other during the construction of a wall panel, each of said stud locators having at least one pair of guide flippers to hold a stud member in its proper location and orientation during the construction of said wall panel, said guide flippers being rotationally, moveably attached to said stud locator to allow for free rotation of said guide flippers in a singular direction towards said header member locator to facilitate the removal of a completed wall panel transversely along said bench modules in the direction of the header member locator, said plate member locator having an angled plate retention means that extends above the horizontal plane defined by the bench module upper planar surface to facilitate the placement and retention of a plate member in a defined relationship with said stud members during the construction of a wall panel, said header member locator further comprises a plurality of swing plate header retention means, each of said swing plates having a tightening means to retain said swing plate in active and inactive stations wherein, in said active station, said swing plate extends above the bench module upper planar surface and said tightening means is tightened to exert a compressive force upon a header member in a transverse direction along the axis of said stud members when said header member is positioned upon said bench module in a defined relationship with said plate and stud members, and wherein, in said inactive station, said swing plate is at or below the horizontal plane defined by the bench module upper planar surface to allow a completed wall panel to be readily removed from said framing table apparatus transversely across said bench modules in the direction of the header member locator, each portion of said upper planar surface that communicates with framing members further comprises a plastic veneer material affixed thereto to allow for ease of removal of completed wall panels, said lower planar surface further comprises at least two runners affixed thereto in a transverse direction, said runners allowing said benches to be adjustably, transversely positioned with respect to each other;

each of said leg modules having a cantilever shape to allow for storage of framing members in a horizontal fashion beneath the horizontal planar surface of said bench modules when the framing table apparatus is assembled, and base and top portions, said top portion comprising a channel that runs along the length of said leg and cooperates with said runners of the lower planar surfaces of said bench modules that rest upon said leg module when said apparatus is assembled, thus allowing for adjustment of the transverse separation distance between the two bench modules of each subassembly;

each of said divider modules comprising first and second ends, each of said ends having angled attachment means connected thereto, said attachment means for joining said ends of said dividers to said leg modules in such a fashion that the assembled apparatus is both rigid and square.

9. The apparatus of claim 8 wherein said veneer means is aluminum.

10. The apparatus of claim 8 wherein said veneer means is a plastic material.

11. The apparatus of claim 10 wherein said plastic material is GARDUR.

* * * * *